US010006816B2

(12) United States Patent
Blyskal et al.

(10) Patent No.: US 10,006,816 B2
(45) Date of Patent: Jun. 26, 2018

(54) ACTIVATABLE TEMPERATURE INDICATOR

(71) Applicant: TEMPTIME CORPORATION, Morris Plains, NJ (US)

(72) Inventors: Philip J. Blyskal, Princeton, NJ (US); James M. Wittes, Princeton, NJ (US); Richard P. Carney, Flemington, NJ (US); Nicholas A. Maas, Morristown, NJ (US)

(73) Assignee: TEMPTINE CORPORATION, Morris Plains, NJ (US)

(*) Notice: Subject to any disclaimer, the term of this patent is extended or adjusted under 35 U.S.C. 154(b) by 311 days.

(21) Appl. No.: 14/875,793

(22) Filed: Oct. 6, 2015

(65) Prior Publication Data
US 2016/0097683 A1 Apr. 7, 2016

Related U.S. Application Data

(60) Provisional application No. 62/060,297, filed on Oct. 6, 2014.

(51) Int. Cl.
G01K 11/06 (2006.01)
G01K 3/04 (2006.01)

(52) U.S. Cl.
CPC ............... G01K 11/06 (2013.01); G01K 3/04 (2013.01)

(58) Field of Classification Search
CPC .................................. G01K 3/04; G01K 11/06
USPC ........ 116/216, 217, 218, 219; 374/106, 160, 374/161, 162
See application file for complete search history.

(56) References Cited

U.S. PATENT DOCUMENTS 3,954,011 A * 5/1976 Manske .................... G01K 3/04
116/207
4,353,990 A * 10/1982 Manske et al. ........... A61L 2/28
116/207

(Continued)

FOREIGN PATENT DOCUMENTS

DE   2165004 A1 * 8/1972 ............ G01K 11/06
FR   2887025 A1 * 12/2006 ............... G01K 3/04

OTHER PUBLICATIONS

Safe-T-Vue Handling/Use Instructions/Frequently Asked Questions (FAQs), and Color Change Interpretation Information, May 2010.
Safe-T-Vue 10 Product No. 7201 QA data sheet for lot #S10 051112, Sep. 25, 2009.
Safe-T-Vue Product Validation Procedure (William Laboratories SOP QA/0102 REV 03), 3 pages, date unknown.
Shockwatch Blood Temp Instructions, 1 page, date unknown.
Shockwatch Blood Temp indicator and Benefits Sheets, 1 page, date unknown.
Shockwatch Validation BloodTemp10, 13 pages, date unknown.
Shockwatch Blood Temp Technical Datasheet, Jun. 2014.
HemoTemp II User Guide, Sep. 13, 2012.
HemoTemp II Product Bulletin, 1 page, date unknown.
Biosynergy StaFreez Users Guide and Product Bulletin, 2013.
Biosynergy StaFreez Product Bulletin, 2007.
Cryoguard How it works Brochure, 2 pages, date unknown.
Cryoguard Directions and Product Information, 1 page, date unknown.

(Continued)

Primary Examiner — Richard A. Smith
(74) Attorney, Agent, or Firm — K&L Gates LLP

(57) ABSTRACT

Apparatuses and methods for indicating when a container has reached a predefined temperature are disclosed. An activatable temperature indicator can include a first indicator portion with a first material with a melting point, and a second indicator portion with a second material configured to change color when combined with the first material of the first indicator portion when the first material reaches the melting point. A separation member can be removeably positioned between the first indicator portion and the second indicator portion, and a biasing mechanism can be configured to bias the first indicator portion and the second indicator portion into contact when the separation member is removed. An attachment mechanism can also be used to place the first indicator portion and the second indicator portion into contact.

21 Claims, 11 Drawing Sheets

(56) References Cited

U.S. PATENT DOCUMENTS

| | | | | |
|---|---|---|---|---|
| 4,793,717 A * | 12/1988 | Manske | ............... | G01K 3/00 |
| | | | | 116/219 |
| 5,368,905 A * | 11/1994 | Ohno | ............... | G01K 3/04 |
| | | | | 368/327 |
| 5,745,039 A * | 4/1998 | Hof et al. | ............... | A61L 2/28 |
| | | | | 116/204 |
| 6,534,006 B2 * | 3/2003 | Hehenberger | ............ | A61L 2/28 |
| | | | | 116/206 |
| 8,061,294 B2 * | 11/2011 | Suda et al. | ............ | G01K 11/06 |
| | | | | 116/216 |
| 8,387,552 B2 * | 3/2013 | Branch | ............... | G01L 5/0052 |
| | | | | 116/203 |
| 8,701,587 B2 * | 4/2014 | Park | ............... | G01K 3/04 |
| | | | | 116/219 |
| 8,707,887 B2 * | 4/2014 | Suda et al. | ............ | G01K 11/06 |
| | | | | 116/216 |
| 8,800,472 B2 * | 8/2014 | Park | ............... | G01K 3/04 |
| | | | | 116/219 |
| 2012/0083043 A1 * | 4/2012 | Grande Telleria et al. | | |
| | | | ............... | G01K 3/04 |
| | | | | 436/164 |

OTHER PUBLICATIONS

Cryoguard Handling and Activation (User Guide), 2 pages, date unknown.
WarmMark2 Product Information, 4 pages, date unknown.
WarmMark2 Technical Brochure, 63 pages, Jun. 22, 2012.
Life Guard Instruction Manual, version Jul. 23, 2013.
Life Guard Monitoring System for Blood Bag Temperature, 2 pages, date unknown.

* cited by examiner

ACTIVATABLE TEMPERATURE INDICATOR

PRIORITY CLAIM

This application claims the benefit of U.S. provisional patent application No. 62/060,297 filed on Oct. 6, 2014, the entire disclosure of which is incorporated by reference herein.

FIELD OF THE INVENTION

The present disclosure generally relates to apparatuses and methods for indicating when a container has reached a predefined temperature, and more specifically to apparatuses and methods that use two tablets of material as part of an indicator to indicate when a container has reached the predefined temperature.

BACKGROUND

When dealing with certain products, particularly in the medical industry, it is important to keep track of temperature. For example, it can be important to monitor products for cumulative heat exposure and threshold heat events. Cumulative heat exposure can cause many medical products to lose potency, and exposure to temperatures above certain threshold limits can also be damaging. In addition to medical products, other materials, such as perishable foods, must be stored at certain temperatures and can spoil if subjected to certain temperatures, or to a certain amount of cumulative heat exposure.

To combat these problems, temperature indicators can be attached to the containers of such products and can be used to determine whether the products have reached a particularly damaging temperature. Temperature indicators are often affixed by manufacturers to primary and/or secondary packaging and boxes of drugs, vaccines, biologics, and other temperature-sensitive medical and other products to determine whether the products have reached an unsafe temperature. Temperature control is necessary during manufacturing, delivery and storage, as well as to continuously monitor products during use.

Presently used temperature indicators, however, are often bulky and/or difficult to activate. Additionally, such temperature indicators require activation by a person in a manner that may cause the indicators to malfunction due to the incorrect placement of the person's fingers during activation and/or use.

There is accordingly a need in the art for a compact, reliable temperature indicator that can be activated by a person with ease, without requiring the person to place their fingers in a manner that can cause the temperature indicator to malfunction or lose its reliability.

SUMMARY

The present disclosure generally relates to apparatuses and methods for indicating when a container has reached a certain temperature. In a general example embodiment, an activatable temperature indicator includes a housing, a first indicator portion held by the housing, the first indicator portion including a first material with a melting point, a second indicator portion held by the housing, the second indicator portion including a second material configured to change color when combined with the first material of the first indicator portion when the first material reaches the melting point, a separation member removeably positioned between the first indicator portion and the second indicator portion, and a biasing mechanism configured to bias the first indicator portion and the second indicator portion into contact when the separation member is removed from between the first indicator portion and the second indicator portion.

In another embodiment, the biasing mechanism includes at least one spring or spring strip.

In another embodiment, the biasing mechanism biases one of the first indicator portion and the second indicator portion into contact with the other of the first indicator portion and the second indicator portion.

In another embodiment, at least one of the first indicator portion and the second indicator portion is a porous tablet.

In another embodiment, the first material includes a wax mixture.

In another embodiment, the activatable temperature indicator includes a viewing port that allows the second indicator portion to be viewed from outside of the housing.

In another embodiment, the first indicator portion is positioned within a conductive cup held by the housing.

In another embodiment, the biasing mechanism biases the first indicator portion and the second indicator portion into contact by biasing the conductive cup towards the second indicator portion.

In another embodiment, the housing includes stainless steel.

In another general embodiment, an activatable temperature indicator includes a lower housing including first material with a melting point, an upper housing including a second material configured to change color when combined with the first material when the first material reaches the melting point, and an attachment mechanism configured to attach the upper housing to the lower housing, wherein attachment of the upper housing to the lower housing by the attachment mechanism places the first material in contact with the second material and holds the first material and the second material in contact when the first material reaches the melting point.

In another embodiment, the first material is positioned in a conductive cup held by the lower housing.

In another embodiment, the conductive cup includes copper.

In another embodiment, the attachment mechanism includes at least one arm located on the lower housing, the at least one arm configured to fit into at least one aperture of the upper housing.

In another embodiment, the upper housing includes an insulating member positioned around the second material.

In another embodiment, the lower housing includes a flange including a bottom surface configured to attach to a container.

In another embodiment, the flange includes a plurality of feet configured to attach to the container.

In another embodiment, the attachment member attaches the upper housing to the lower housing when at least one of the upper housing and the lower housing is twisted with respect to the other of the upper housing and the lower housing.

In another embodiment, the housing includes stainless steel.

In another general embodiment, an activatable temperature indicator includes a housing including a bottom surface configured to attach to a container, a conductive cup located proximate to the bottom surface of the housing, a first indicator portion positioned within the conductive cup, the first indicator portion including a first material with a melting point, a second indicator portion held by the housing, the second indicator portion including a second material configured to change color when combined with the first material of the first indicator portion when the first material reaches the melting point, and an activation mechanism configured to bias the first indicator portion and the second indicator portion into contact before and after the first material reaches the melting point.

In another embodiment, the conductive cup includes copper.

In another embodiment, the activatable temperature indicator includes a separation member removeably positioned between the first indicator portion and the second indicator portion before the activation mechanism biases the first indicator portion and the second indicator portion into contact.

In another embodiment, the activation mechanism biases one of the first indicator portion and the second indicator portion into contact with the other of the first indicator portion and the second indicator portion.

In another embodiment, the activation mechanism includes at least one of: (i) an attachment mechanism; and (ii) a biasing mechanism.

In another embodiment, the housing includes an upper housing and a lower housing, and wherein the attachment mechanism biases the first indicator portion and the second indicator portion into contact when at least one of the upper housing and the lower housing is twisted with respect to the other of the upper housing and the lower housing.

In another embodiment, the housing includes stainless steel.

In another general embodiment, a method of determining when contents of a container have reached a threshold temperature includes placing a housing on a container, the housing including a lower indicator portion and an upper indicator portion separated by a separation member, sliding the separation member out from between the lower indicator portion and the upper indicator portion, biasing at least one of the lower indicator portion and the upper indicator portion towards the other of the lower indicator portion and the upper indicator portion so that the lower indicator portion remains in contact with the upper indicator portion, and viewing a change in color of the upper indicator portion when a material of the lower indicator portion migrates into the upper indicator portion.

In another general embodiment, a method of determining when contents of a container have reached a threshold temperature includes placing a lower housing on the container, the lower housing including a lower indicator portion, attaching an upper housing to the lower housing so that an upper indicator portion of the upper housing is biased against the lower indicator portion, and viewing a change in color of the upper indicator portion when a material of the lower indicator portion migrates into the upper indicator portion.

In another embodiment, attaching the upper housing to the lower housing includes twisting the upper housing onto the lower housing.

In another embodiment, the method includes attaching the upper housing to the lower housing by at least one arm extending from at least one of the upper housing and the lower housing.

In another general embodiment, a method of determining when contents of a container have reached a threshold temperature includes attaching an upper housing including an upper indicator portion to a lower housing including a lower indicator portion so that at least one of the upper indicator portion and the lower indicator portion is biased against the other of the upper indicator portion and the lower indicator portion, placing the lower housing on the container, and viewing a change in color of the upper indicator portion when a material of the lower indicator portion migrates into the upper indicator portion.

In another embodiment, the method includes holding the lower indicator portion within a conductive cup positioned in the lower housing.

In another embodiment, the method includes placing the lower housing on the container so that the conductive cup contacts the container.

BRIEF DESCRIPTION OF THE FIGURES

Embodiments of the present disclosure will now be explained in further detail by way of example only with reference to the accompanying figures, in which.

DETAILED DESCRIPTION

Figure 1:
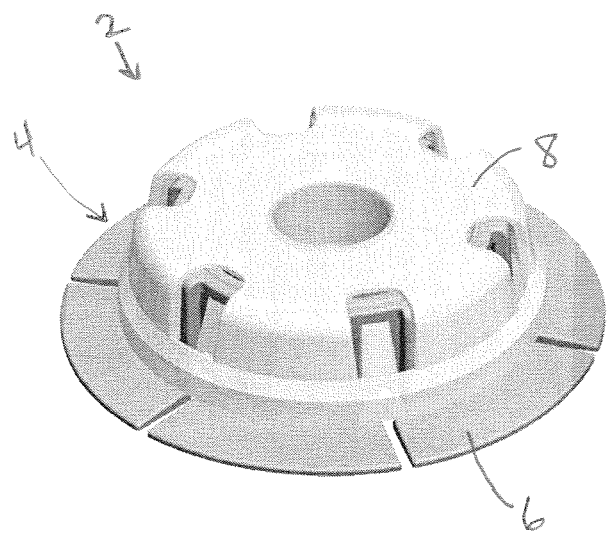
FIG. 1 depicts a top perspective of an activatable temperature indicator, according to one example embodiment of the present disclosure.
Figure 2:
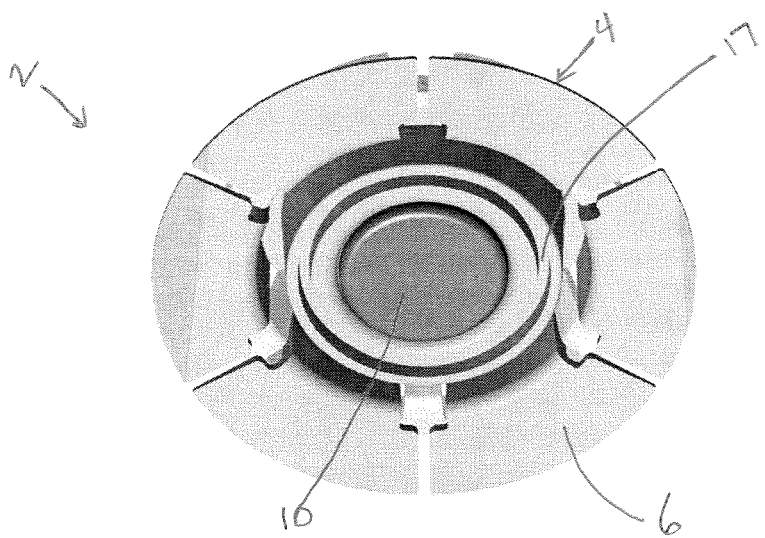
FIG. 2 depicts a bottom perspective view of the activatable temperature indicator of FIG. 1.

Before the disclosure is described, it is to be understood that this disclosure is not limited to the particular apparatuses and methods described. It is also to be understood that the terminology used herein is for the purpose of describing particular embodiments only, and is not intended to be limiting, since the scope of the present disclosure will be limited only to the appended claims.

As used in this disclosure and the appended claims, the singular forms "a," "an" and "the" include plural referents unless the context clearly dictates otherwise. The methods and apparatuses disclosed herein may lack any element that is not specifically disclosed herein. Thus, "comprising," as used herein, includes "consisting essentially of" and "consisting of."

FIGS. 1 to 4 show an example embodiment of an activatable temperature indicator 2 including a housing 4. In this embodiment, housing 4 includes a lower housing 6 and an upper housing 8, between which activatable temperature indicator 2 further includes a conductive cup 10, a lower indicator portion 12, an upper indicator portion 14, and an insulating member 16. In use, and as explained in more detail below, the bottom surface 20 of lower housing 6 is placed against and adheres to a container, for example, a vial or blood bag, and a person can view a change in the temperature of the container by viewing a color change of upper indicator portion 14 through an aperture 18 located in the center of upper housing 8.

Figure 5:
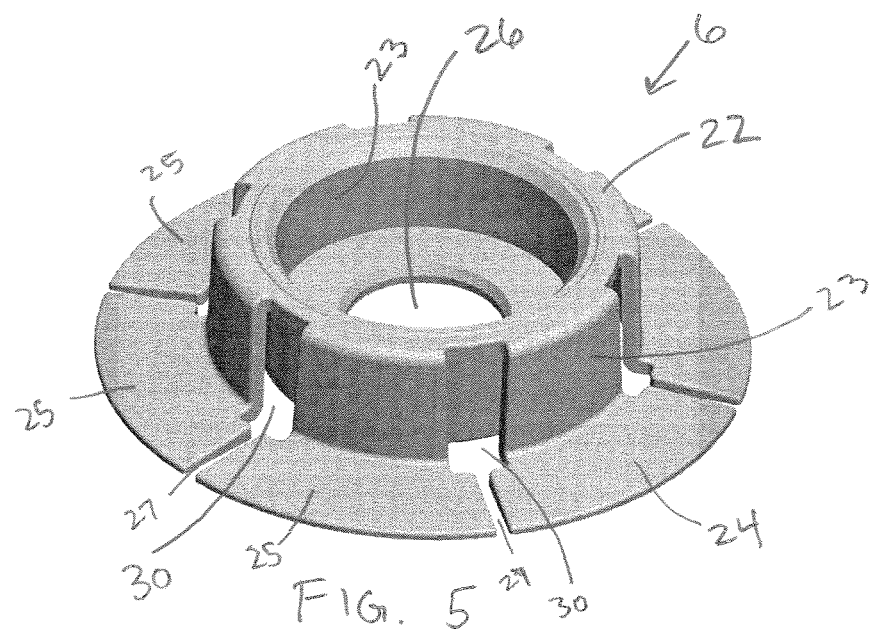
FIG. 5 depicts a top perspective view of the lower housing of the activatable temperature indicator of FIG. 1.
Figure 6:
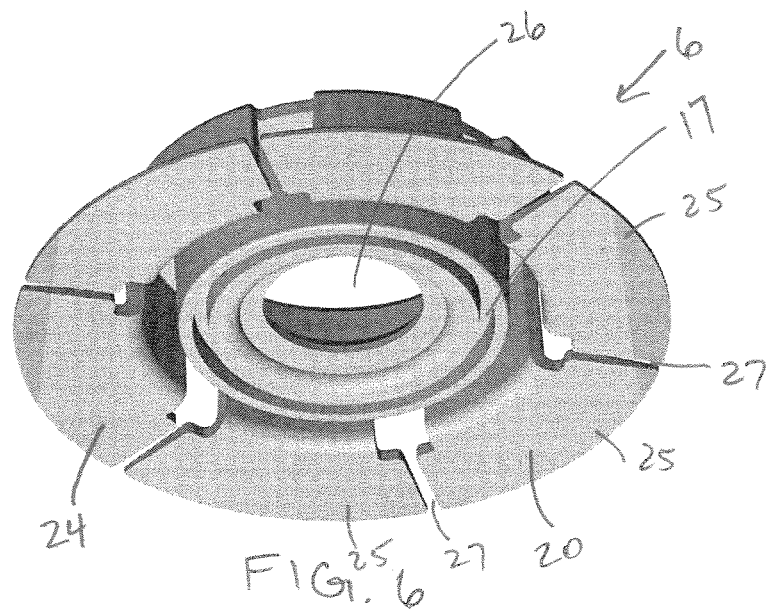
FIG. 6 depicts a bottom perspective view of the lower housing of the activatable temperature indicator of FIG. 1.
Figure 7:
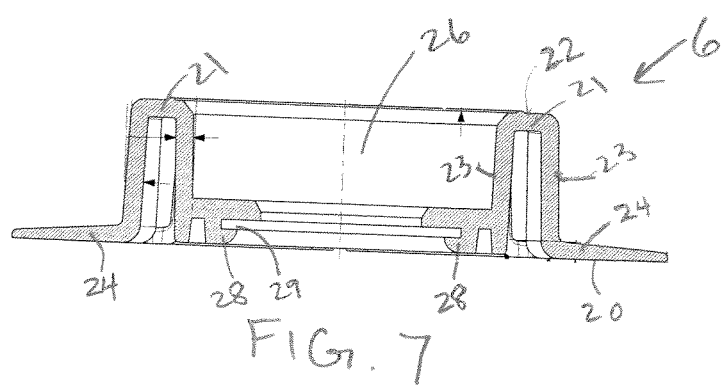
FIG. 7 depicts a cross-sectional view of the lower housing of the activatable temperature indicator of FIG. 1.

FIGS. 5 to 7 show lower housing 6 of activatable temperature indicator 2. Lower housing 6 provides a foundation for the other components of activatable temperature indicator 2. In the disclosed embodiment, lower housing 6 is a spherical disk which includes a bottom surface 20 and a top surface 22. A flange 24 extends radially outward from the center of lower housing 6 at bottom surface 20 and can be used to attach activatable temperature indicator 2 to a container using an adhesive or any other attachment mechanism known in the art. In an embodiment, lower housing 6 is made of a plastic, such as polyethylene terephthalate glycol-modified (PETG), is about 0.33 inches tall and about 1.5 inches in diameter measured from the outer edges of flange 24, and the side walls 23 of lower housing 6 are about 0.04 inches wide. In another embodiment, lower housing 6 is made of stainless steel to prevent evaporation of the material of lower indicator portion 12 and/or upper indicator portion 14. Those of ordinary skill in the art will understand that any suitable materials and dimensions can be chosen for lower housing 6.

In the embodiment shown, flange 24 includes six feet 25 separated by small gaps 27. The bottom surface of each foot 25 attaches to a container, such as a blood bag, by use of an adhesive or another attachment mechanism known in the art. The use of a plurality of feet 25 separated by small gaps 27 is particularly advantageous with a flexible container such as a blood bag because the separate feet 25 allow the base of activatable temperature indicator 2 to conform to the flexible container. The gaps 27 also lead into apertures 30, which can be used to attach upper housing 8 to lower housing 6, as explained in more detail below.

The center of lower housing 6 includes an aperture 26 and a retainment member 28. Retainment member 28 can be used to hold conductive cup 10 within aperture 26. In the embodiment shown, retainment member 28 holds conductive cup 10 by providing an indentation 29 for a lip 33 of conductive cup 10 to rest on and/or within.

Figure 3:
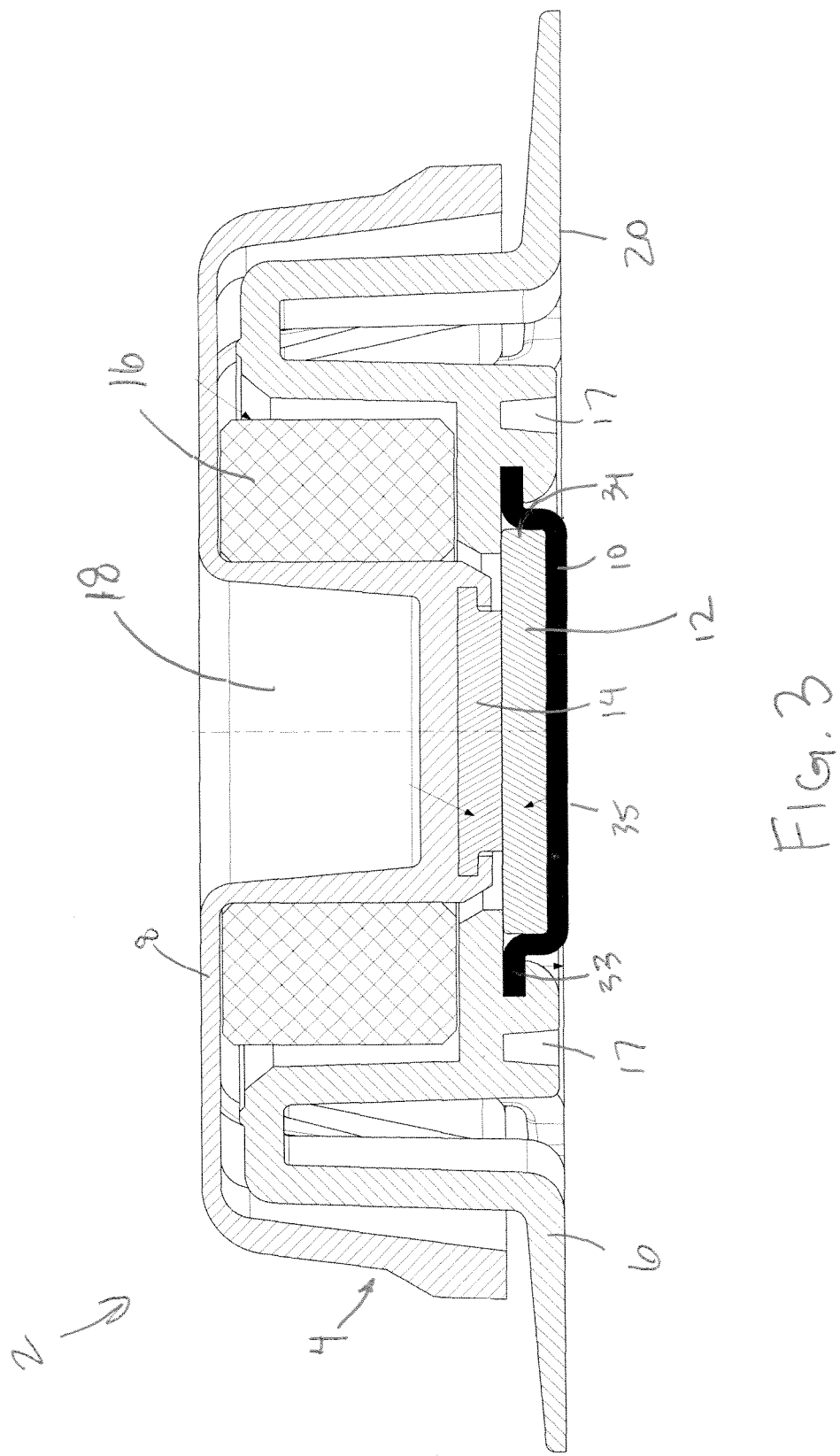
FIG. 3 depicts a cross-sectional view of the activatable temperature indicator of FIG. 1.
Figure 4:
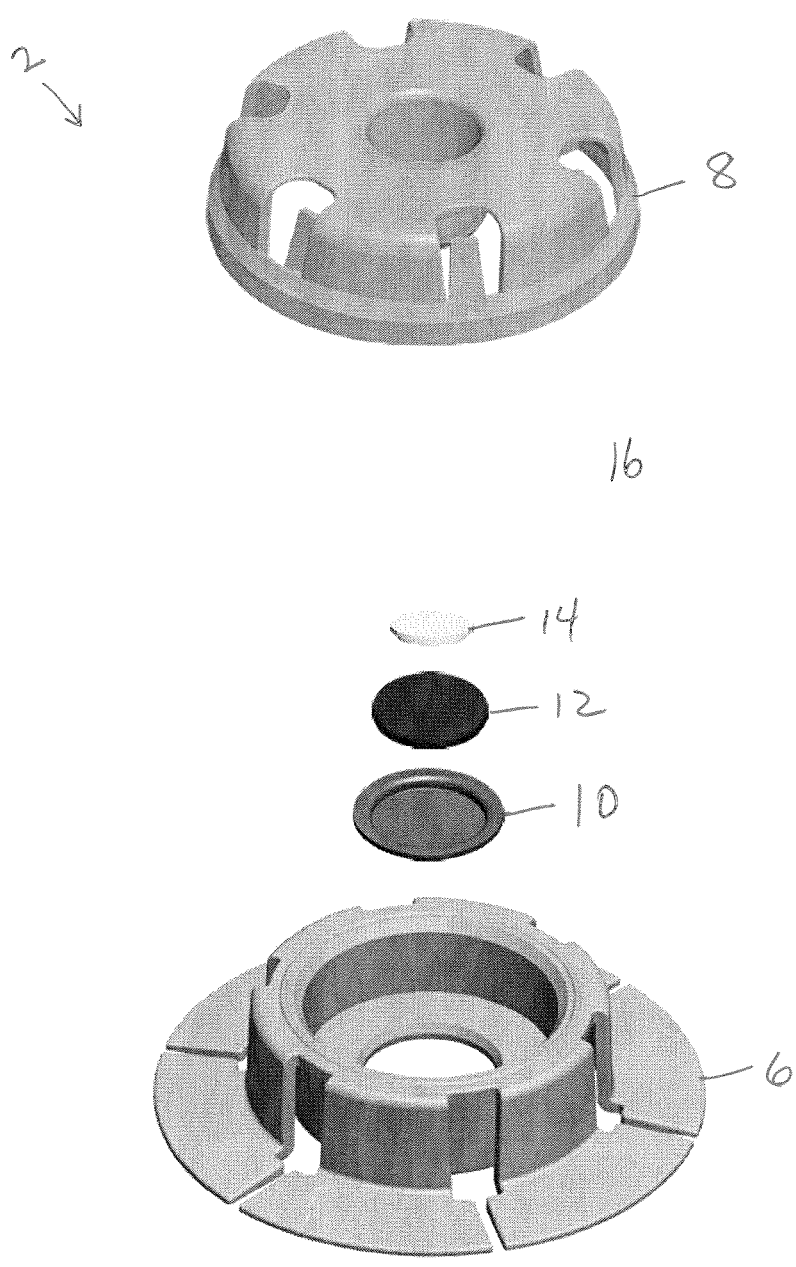
FIG. 4 depicts an exploded view of the activatable temperature indicator of FIG. 1.

Conductive cup 10 includes an indentation 34 for receiving and securing lower indicator portion 12, as shown in FIG. 3. The purpose of conductive cup 10 is to provide increased heat conductivity within activatable temperature indicator 2, as explained in more detail below. In the embodiment shown, conductive cup 10 is a copper cup. In an embodiment, the outer diameter of lip 33 of conductive cup 10 is about 0.55 inches, the walls of conductive cup 10 are about 0.0216 inches thick, the diameter of indentation 34 is about 0.42 inches, and the depth of indentation 34 is about 0.045 inches. In an alternative embodiment, conductive cup 10 can be removed and/or retainment member 28 can be configured to directly hold onto lower indicator portion 12.

Figure 8:
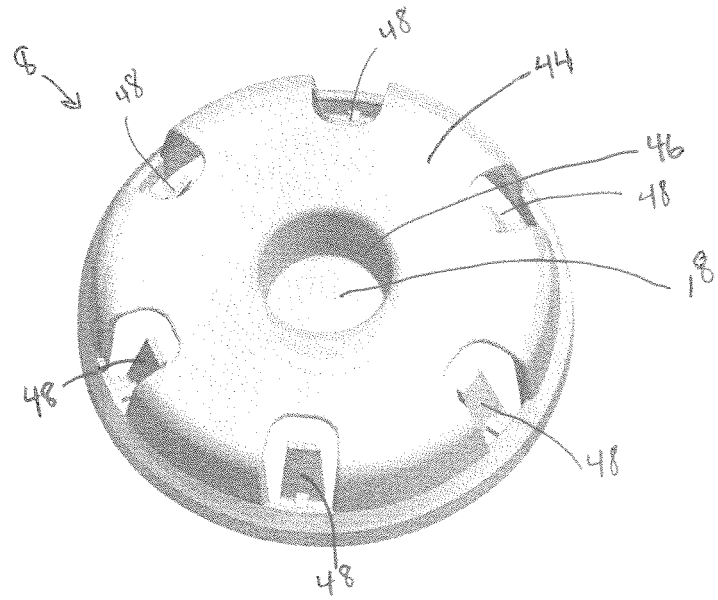
FIG. 8 depicts a top perspective view of the upper housing of the activatable temperature indicator of FIG. 1.
Figure 9:
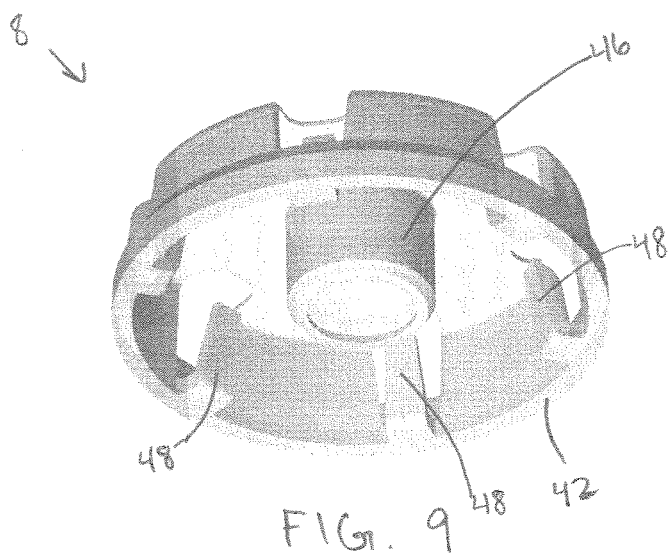
FIG. 9 depicts a bottom perspective view of the upper housing of the activatable temperature indicator of FIG. 1.
Figure 10:
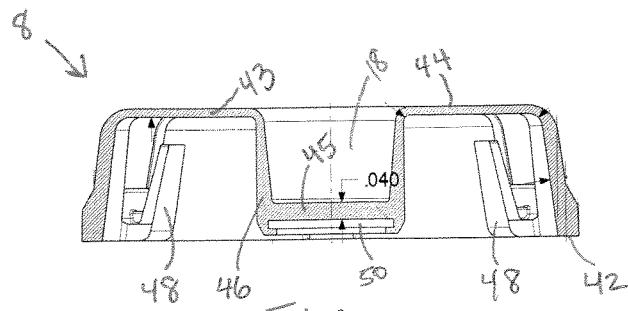
FIG. 10 depicts a cross-sectional view of the upper housing of the activatable temperature indicator of FIG. 1.
Figure 11:
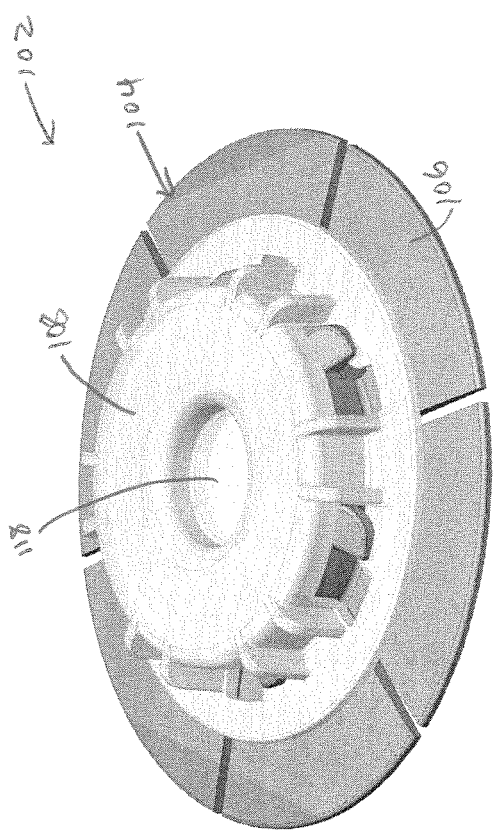
FIG. 11 depicts a top perspective view of another activatable temperature indicator, according to a second example embodiment of the present disclosure.

FIGS. 8 to 10 show upper housing 8 of activatable temperature indicator 2. Upper housing 8 attaches to lower housing 6 to activate activatable temperature indicator 2 by securing upper indicator portion 14 against lower indicator portion 12. In the disclosed embodiment, upper housing 8 is a spherical disk which includes a bottom surface 42, a top surface 44, a center portion 46 and at least one attachment member 48. In an embodiment, upper housing 8 is made of a plastic, such as polyethylene terephthalate glycol-modified (PETG), is about 0.315 inches tall and about 1.18 inches in diameter, with the wall 43 of the top surface 44 being about 0.02 inches wide, and the wall 45 of the center portion 46 being about 0.04 inches wide. In another embodiment, upper housing 8 is made of stainless steel to prevent evaporation of the material of lower indicator portion 12 and/or upper indicator portion 14. Those of ordinary skill in the art will understand that any suitable materials and dimensions can be chosen for upper housing 8.

Attachment member 48 attaches upper housing 8 to lower housing 6. In the disclosed embodiment, attachment member 48 is an arm that extends upward from bottom surface 42 and that fits underneath a wall 21 of top surface 22 of lower housing 6 through apertures 30 in lower housing 6 to attach upper housing 8 to lower housing 6. Once attached to lower housing 6, the upper edge of attachment member 48 presses against wall 21 of top surface 22, which in combination with the shapes of the upper housing 8 and the lower housing 6 provides a biasing force to keep upper housing 8 from separating from lower housing 6 and to keep upper indicator portion 14 in contact with lower indicator portion 12. Those of ordinary skill in the art will understand that any suitable attachment member can be used to attach upper housing 8 to lower housing 6, for example, threads, clamps, etc. Those of ordinary skill in the art will further recognize that one or more attachment members can be located on lower housing 6, on upper housing 8, or on both lower housing 6 and upper housing 8. In the embodiment shown, upper housing 8 includes six attachment members 48 that are configured to fit into six corresponding apertures 30 of lower housing 6.

Center portion 46 of upper housing 8 includes a retainment section 50 that is configured to secure upper indicator portion 14 so that upper indicator portion 14 is held against lower indicator portion 12 when upper housing 8 is attached to lower housing 6. In the disclosed embodiment, retainment section 50 is a spherical-shaped indentation which allows upper indicator portion 14 to fit into center portion 46, but those of ordinary skill in the art will recognize other suitable mechanisms for securing upper indicator portion 14.

In the embodiment shown, lower indicator portion 12 and upper indicator portion 14 are porous tablets, such as disks, including a foam plastic such as polyethylene. In an embodiment, lower indicator portion 12 has a height of about 0.045 inches and a diameter of about 0.42 inches, and upper indicator portion 14 has an upper height of about 0.020 inches, an upper diameter of about 0.30 inches, a lower height of about 0.025 inches and a lower diameter of about 0.25 inches. The upper height and upper diameter of upper indicator portion 14 correspond to the section of portion 14 that includes a step 52 that fits into the indentation of retainment section 50, and the lower height and lower diameter of upper indicator portion 14 correspond to the section of portion 14 that comes into contact with lower indicator portion 12. Those of ordinary skill in the art will recognize that other shapes and materials can be used for lower indicator portion 12 and upper indicator portion 14.

Lower indicator portion 12 is filled with a material, such as a wax mixture, with a melting point. In an embodiment, the material is a wax mixture that includes an alkane wax and a liquid dye. When lower indicator portion 12 is held against upper indicator portion 14 and the material of lower indicator portion 12 reaches its melting point, the material migrates into upper indicator portion 14 and changes the color of upper indicator portion 14. A user viewing upper indicator portion 14 through aperture 18 can therefore determine when lower indicator portion 12 has reached the melting point by viewing the change in color of upper indicator portion 14. In an embodiment, aperture 18 can include a viewing port or a viewing window with a layer of glass or plastic to allow viewing of upper indicator portion from outside housing 4. Such a layer can be sufficiently transparent to allow color changes that meet color change standards to be readily observed.

An indicator portion material as described herein can be a solid, liquid, gel, semi-solid, colloid, or the like that can change state, color, transparency, or a combination thereof upon introduction to a predetermined condition. For example, a clear colloid may become opaque or white when subjected to a predetermined condition. In some embodiments, the indicator portion material goes from clear to opaque or darkly colored, or from opaque or darkly colored to clear, when the indicator portion is subjected to the predetermined condition. A predetermined condition can be a desired or undesired condition for which indication that such a condition has been met can be determined. For example, a predetermined condition may be freezing, boiling, a particular temperature or range of temperatures, a low temperature threshold, a high temperature threshold, a thermal history, exposure to light, exposure to a particular wavelength of light such as UV light, exposure to liquid such as humidity, exposure to excess pressure, subject to contamination such as bacteria, or the like, or a combination thereof. In one embodiment, the predetermined condition is the substance in the container reaching a temperature that causes the material of lower indicator portion 12 to reach its melting point.

Color includes achromatic visual appearances, for example, black, gray, and white, and chromatic visual appearances, including primary color hues, secondary color hues and/or other color hues, for example, without limitation, red, yellow, green, blue, purple, orange, brown, etc. The natural color of the colorant refers to the appearance of the colorant, including, intensity, shade, tint, hue, etc., in the same medium and at the same concentration or amount without any scattering effect. The term "color change" and its grammatical variants are used to refer to changes in hue, intensity or lightness (or darkness) or other changes in visual appearance.

Activatable temperature indicator 2 is activated when upper indicator portion 14 and lower indicator portion 12 are placed in contact. As shown in FIG. 3, the attachment of upper housing 8 to lower housing 6 activates activatable temperature indicator 2 by placing upper indicator portion 14 in contact with lower indicator portion 12 at the center of activatable temperature indicator 2. In the disclosed embodiment, each of the six attachment members 48 fit into corresponding apertures 30 in lower housing 6 and contact wall 21 of top surface 22 of lower housing 6, which provides a biasing force to hold upper housing 8 against lower housing 6 and to hold upper indicator portion 14 against lower indicator portion 12. As shown in FIG. 3, the attachment of upper housing 8 to lower housing 6 places upper indicator portion 14 into center aperture 26 of lower housing 6 and in contact with lower indicator portion 12, which is held within conductive cup 10 in the center of lower housing 6. In this way, attachment member 48 acts as an activation mechanism to activate activatable temperature indicator 2 for use. The force from the plurality of attachment members 48 against wall 21 of lower housing 6 in combination with the shapes of the upper housing 8 and the lower housing 6 provides a biasing spring force that ensures that upper indicator portion 14 will remain in contact with lower indicator portion 12 as long as upper housing 8 remains attached to lower housing 6. In an embodiment, housing 4 can function similar to a Bellville spring-washer when locked into place, wherein a biasing force is provided by a slight deformation of the dome-shape of upper housing 8 and/or lower housing 6. Activatable temperature indicator 2 can also be provided with one or more springs or spring strips to provide a spring force to ensure that lower indicator portion 12 and upper indicator portion 14 remain in contact during use of activatable temperature indicator 2. Once activatable temperature indicator has been activated, upper indicator portion 14 remains in contact with lower indicator portion 12 until the material from lower indicator portion 12 melts and migrates to upper indicator portion 14, at which point activatable temperature indicator 2 can be discarded.

As shown in FIG. 3, activatable temperature indicator 2 can include an insulating member 16 that is placed between upper housing 8 and lower housing 6 when upper housing 8 is attached to lower housing 6. In an embodiment, insulating member 16 is a foam disk, made of a polyurethane foam or a rubber foam, but those of ordinary skill in the art will recognize other materials to use for insulation. The purpose of insulating member 16 is to insulate upper indicator portion 14 from outside air. Insulating member 16 can be provided as part of lower housing 6, as part of upper housing 8, or as a separate element placed between lower housing 6 and upper housing 8 when lower housing 6 and upper housing 8 are attached. In the embodiment shown, insulating member 16 is friction fit around center portion 46 of upper housing 8 so that the attachment of upper housing 8 to lower housing 6 places insulating member 16 between upper housing 8 and lower housing 6.

By using conductive cup 10 and/or insulating member 16, activatable temperature indicator 2 can accurately control the temperature of lower indicator portion 12 and upper indicator portion 14. Conductive cup 10 increases heat conductivity between the container upon which indicator 2 is placed and lower indicator portion 12 which is positioned within conductive cup 10. Insulating member 16 insulates the center of upper housing 8, including upper indicator portion 14, from outside air. Thus, by using one or both of conductive cup 10 and insulating member 16, activatable temperature indicator 2 can more correctly identify when the container has reached the temperature which causes the material in lower temperature indicator 12 to reach its melting point. That is, conductive cup 10 passively directs heat flow and ensures that lower indicator portion 12 is as close to the temperature of the container as possible, and insulating member 16 forms a thermal barrier between the outside of activatable temperature indicator 2 and aperture 18, ensuring that the temperature of the surrounding environment has a minimal effect on activatable temperature indicator 2. As shown in FIG. 3, the bottom surface 35 of conductive cup 10 can protrude slightly from the bottom surface 20 of lower housing 6, ensuring that conductive cup 10 contacts and remains in contact with a container during use of activatable temperature indicator 2. The bottom surface 20 of lower housing 6 can also provide an air gap 17 around cupper cup 10 for additional insulation.

An advantage of activatable temperature indicator 2 is that the configuration and placement of lower indicator portion 12 and upper indicator portion 14, as well as the activation by attachment of upper housing 8 to lower housing 6, keeps a person's fingers away from the center of housing 4 during attachment. This is critical to preventing an instant response from activatable temperature indicator 2 by activation from a person's body heat. That is, when a person's fingers are placed in proximity to one or both of upper indicator portion 14 and lower indicator portion 12, the person's body heat can affect the temperatures of the indicator portions and cause the material in lower indicator portion 12 to melt and/or migrate to upper indicator portion 14. Activatable temperature indicator 2 avoids this problem because attachment mechanism 48 allows a person to attach upper housing 8 to lower housing 6 without placing the person's fingers near upper indicator portion 14 and lower indicator portion 12 during the attachment and/or activation of activatable temperature indicator 2.

FIGS. 11 to 19 show an alternative embodiment of an activatable temperature indicator 102 including a housing 104. In this embodiment, housing 104 includes a lower housing 106 and a upper housing 108, between which activatable temperature indicator 102 further includes a conductive cup 110, a lower indicator portion 112, an upper indicator portion 114, and an insulating member 116. In use, the bottom surface 120 of lower housing 106 is placed against and adheres to a container, for example, a vial or blood bag, and a person can view a change in the temperature of the container by viewing a color change of upper indicator portion 114 through a aperture 118 located in the center of upper housing 108. Activatable temperature indicator 102 functions similarly to activatable temperature indicator 2 and may include any of the features of activatable temperature indicator 2. Activatable temperature indicators 2 likewise may include any of the features of activatable temperature indicator 102.

FIGS. 13 to 16 show lower housing 106 of activatable temperature indicator 102. Lower housing 106 provides a foundation for the other components of activatable temperature indicator 102. In the disclosed embodiment, lower housing 106 is a spherical disk which includes a bottom surface 120, a top surface 122, and at least one attachment member 148. A flange 124 extends radially outward from the center of lower housing 106 at bottom surface 120 and can be used to attach activatable temperature indicator 102 to a container using an adhesive or any other attachment mechanism known in the art. In an embodiment, lower housing 106 is made of a plastic, such as polyethylene terephthalate glycol-modified (PETG), is about 0.19 inches tall and about 1.5 inches in diameter measured from the outer edges of flange 24. In another embodiment, lower housing 106 is made of stainless steel to prevent evaporation of the material of lower indicator portion 112 and/or upper indicator portion 114. Those of ordinary skill in the art will understand that any suitable materials and dimensions can be chosen for lower housing 106.

In the embodiment shown, flange 124 includes six feet 125 separated by small gaps 127. The bottom surface of each foot 125 attaches to a container, such as a blood bag, by use of an adhesive or another attachment mechanism known in the art. The use of a plurality of feet 125 separated by small gaps 127 is particularly advantageous with a flexible container such as a blood bag because the separate feet 125 allow the base of activatable temperature indicator 102 to conform to the flexible container.

The center of lower housing 106 includes an aperture 126 and a retainment member 128. Retainment member 128 can be used to hold conductive cup 110 within aperture 126. In the embodiment shown, retainment member 28 holds conductive cup 10 by rolling underneath copper cup 10, as shown in FIG. 12.

Figure 12:
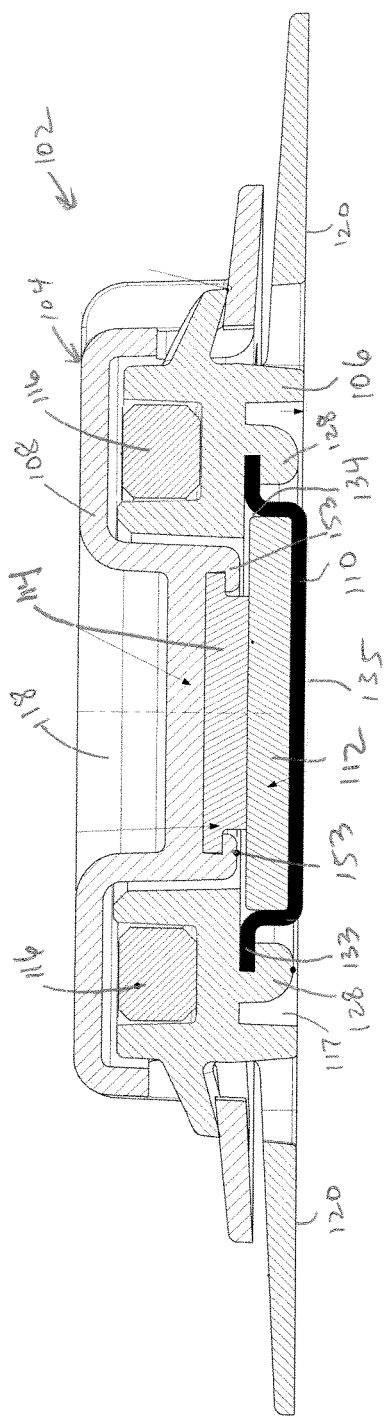
FIG. 12 depicts a cross-sectional view of the activatable temperature indicator of FIG. 11.
Figure 13:
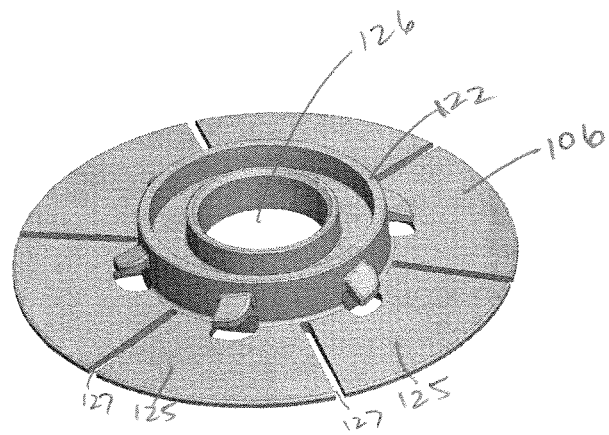
FIG. 13 depicts a top perspective view of the lower housing of the activatable temperature indicator of FIG. 11.
Figure 14:
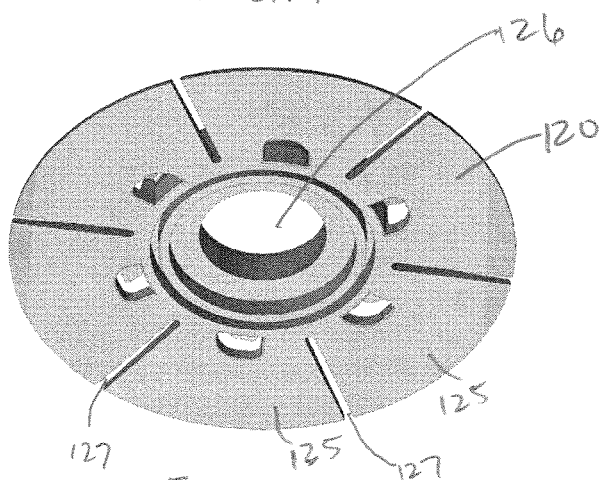
FIG. 14 depicts a bottom perspective view of the lower housing of the activatable temperature indicator of FIG. 11.

Conductive cup 110 includes an indentation 134 for receiving and securing lower indicator portion 112, as shown in FIG. 12. As discussed above, the purpose of conductive cup 110 is to provide increased heat conductivity within activatable temperature indicator 102. In the embodiment shown, conductive cup 110 is a copper cup. In an embodiment, the outer diameter of lip 133 of conductive cup 110 is about 0.55 inches, the walls of conductive cup 110 are about 0.016 inches thick, the diameter of indentation 134 is about 0.42 inches, and the depth of indentation 134 is about 0.051 inches. In an alternative embodiment, conductive cup 110 can be removed and/or retainment member 128 can be configured to directly hold onto lower indicator portion 112.

Figure 17:
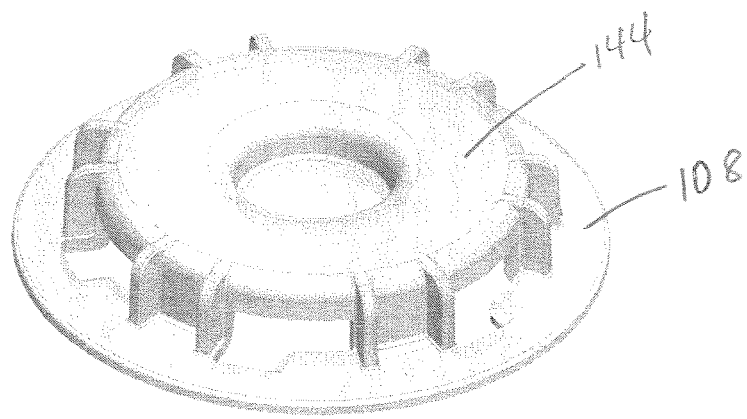
FIG. 17 depicts a top perspective view of the upper housing of the activatable temperature indicator of FIG. 11.
Figure 18:
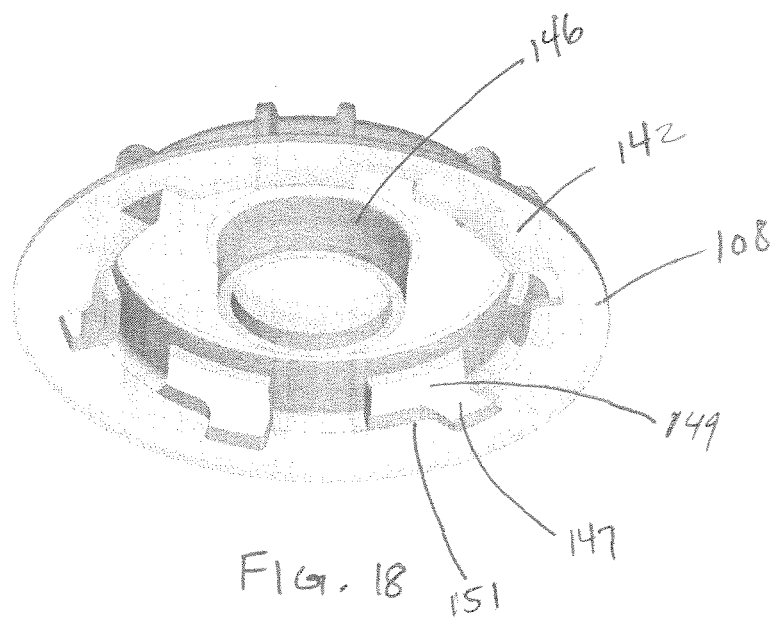
FIG. 18 depicts a bottom perspective view of the upper housing of the activatable temperature indicator of FIG. 11.
Figure 19:
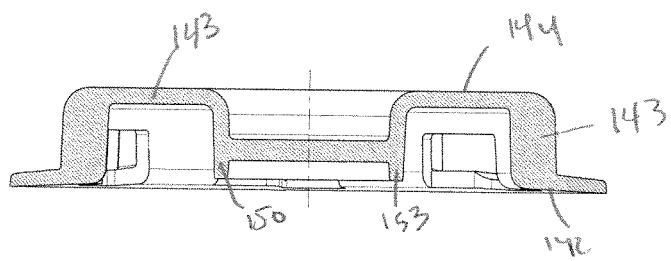
FIG. 19 depicts a cross-sectional view of the upper housing of the activatable temperature indicator of FIG. 11.

FIGS. 17 to 19 show upper housing 108 of activatable temperature indicator 102. Upper housing 108 attaches to lower housing 106 to activate activatable temperature indicator 102 by securing upper indicator portion 114 against lower indicator portion 112. In the disclosed embodiment, upper housing 108 is a spherical disk which includes a bottom surface 142, a top surface 144 and a center portion 146. In an embodiment, upper housing 108 is made of a plastic, such as polyethylene terephthalate glycol-modified (PETG), and is about 0.19 inches tall and about 1.13 inches in diameter. In another embodiment, upper housing 108 is made of stainless steel to prevent evaporation of the material of lower indicator portion 112 and/or upper indicator portion 114. Those of ordinary skill in the art will understand that any suitable materials and dimensions can be chosen for upper housing 108.

Center portion 146 of upper housing 108 includes a retainment section 150 that is configured to secure upper indicator portion 114 so that upper indicator portion 114 is held against lower indicator portion 112 when upper housing 108 is attached to lower housing 106. In the disclosed embodiment, retainment section 150 is a spherical-shaped indentation which allows upper indicator portion 114 to fit into center portion 146, but those of ordinary skill in the art will recognize other suitable mechanisms for securing upper indicator portion 114. In the embodiment shown, retainment section 150 includes members 153 that roll underneath upper indicator portion 114, as shown in FIG. 12.

Attachment member 148 attaches upper housing 108 to lower housing 106. In the disclosed embodiment, attachment member 148 is an arm that extends radially outward from side wall 123 of lower housing 106. When upper housing 108 is placed on top of lower housing 106, each attachment member 148 is placed through a corresponding aperture 147 in the lower surface 142 of upper housing 108. Upper housing 108 can then be twisted with respect to lower housing 106 to attach upper housing 108 to lower housing 106.

Figure 15:
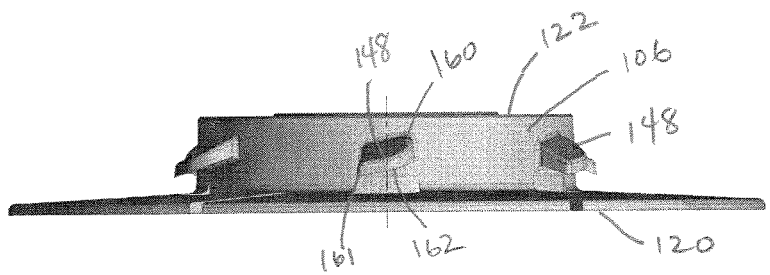
FIG. 15 depicts a side plan view of the lower housing of the activatable temperature indicator of FIG. 11.
Figure 16:
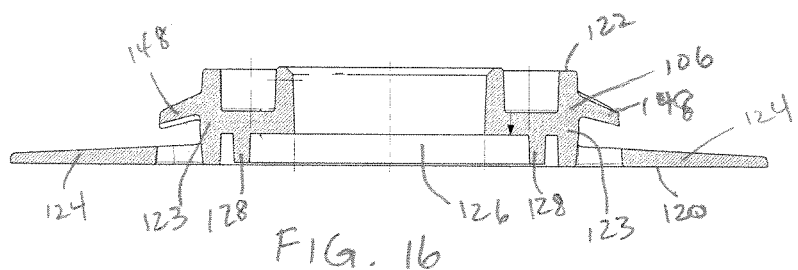
FIG. 16 depicts a cross-sectional view of the lower housing of the activatable temperature indicator of FIG. 11.

As shown in FIG. 15, each attachment member 148 is downwardly angled from a first side 160 to a second side 161 towards bottom surface 120. After attachment member 148 is placed through aperture 147 in the lower surface 142 of upper housing 108, upper housing 108 is twisted with respect to lower housing 106 so that attachment member 148 moves across aperture 149 of side wall 143 and the bottom surface 162 of attachment member 148 covers ledge 151 of upper housing 108. When attachment member 148 is first placed through aperture 147, ledge 151 is located at first side 160. As upper housing 108 is twisted with respect to lower housing 106, bottom surface 162 presses against ledge 151 and the angle of attachment member 148 pushes upper housing 108 downward towards lower housing 106 to secure upper housing 108 to lower housing 106, and to activate activatable temperature indicator 102 by securing upper indicator portion 114 against lower indicator portion 112.

After attachment, bottom surface 162 of attachment member 148 continues to press against ledge 151 of upper housing 108, which provides a biasing force to keep upper housing 108 from separating from lower housing 106 and to keep upper indicator portion 114 in contact with lower indicator portion 112. In an embodiment, housing 104 can function similar to a Bellville spring-washer when locked into place, wherein a biasing force can be provided by a slight deformation of the dome-shape of upper housing 108 and/or lower housing 106. Those of ordinary skill in the art will further recognize that one or more attachment members can be located on lower housing 106, on upper housing 108, or on both lower housing 106 and upper housing 108. In the embodiment shown, lower housing 106 includes six attachment members 148 that are configured to fit into six corresponding apertures 149 of upper housing 108.

Similar to lower indicator portion 12 and upper indicator portion 14, in the embodiment shown, lower indicator portion 112 and upper indicator portion 114 are porous tablets, such as disks, including a foam plastic such as polyethylene. Those of ordinary skill in the art will recognize that other shapes and materials can be used for lower indicator portion 112 and upper indicator portion 114. Lower indicator portion 112 is filled with a material, such as a wax mixture, with a melting point. In an embodiment, the material is a wax mixture that includes an alkane wax and a liquid dye. When lower indicator portion 112 is held against upper indicator portion 114 and the material of lower indicator portion 112 reaches its melting point, the material migrates into upper indicator portion 114 and changes the color of upper indicator portion 114. A user viewing upper indicator portion 114 through aperture 118 can therefore determine when lower indicator portion 112 has reached the melting point by viewing the change in color of upper indicator portion 114. In an embodiment, aperture 118 can include a viewing port or a viewing window with a layer of glass or plastic to allow viewing of upper indicator portion from outside housing 104. Such a layer can be sufficiently transparent to allow color changes that meet color change standards to be readily observed.

Activatable temperature indicator 102 is activated when upper indicator portion 114 and lower indicator portion 112 are placed in contact. As shown in FIG. 12, the attachment of upper housing 108 to lower housing 106 activates activatable temperature indicator 102 by placing upper indicator portion 114 in contact with lower indicator portion 112 at the center of activatable temperature indicator 102. In the disclosed embodiment, each of the six attachment members 148 fit into corresponding apertures 147, 149 in lower housing 106 and push ledge 151 of upper housing 108 downward towards lower housing 108, which provides a biasing force to hold upper housing 108 against lower housing 106 and to hold upper indicator portion 114 against lower indicator portion 112. As shown in FIG. 12, the attachment of upper housing 108 to lower housing 106 places upper indicator portion 114 into center aperture 126 of lower housing 106 and in contact with lower indicator portion 112, which is held within conductive cup 110 in the center of lower housing 106. In this way, attachment member 148 acts as an activation mechanism to activate activatable temperature indicator 102 for use. The force from the plurality of attachment members 148 against ledge 151 provides a biasing spring force that ensures that upper indicator portion 114 will remain in contact with lower indicator portion 112 as long as upper housing 108 remains attached to lower housing 106. Activatable temperature indicator 102 can also be provided with one or more springs or spring strips to provide a spring force to ensure that lower indicator portion 112 and upper indicator portion 114 remain in contact during use of activatable temperature indicator 102. Once activatable temperature indicator has been activated, upper indicator portion 114 remains in contact with lower indicator portion 112 until the material from lower indicator portion 112 melts and migrates to upper indicator portion 114, at which point activatable temperature indicator 102 can be discarded.

As shown in FIG. 12, activatable temperature indicator 102 can include an insulating member 116 that is placed between upper housing 108 and lower housing 106 when upper housing 108 is attached to lower housing 106. In an embodiment, insulating member 116 is a foam disk, made of a polyurethane foam or a rubber foam, but those of ordinary skill in the art will recognize other materials to use for insulation. The purpose of insulating member 116 is to insulate upper indicator portion 114 from outside air. Insulating member 116 can be provided as part of lower housing 106, as part of upper housing 108, or as a separate element placed between lower housing 106 and upper housing 108 when lower housing 106 and upper housing 108 are attached. In the embodiment shown, insulating member 116 is placed in a ring-shaped aperture of lower housing 106 so that the attachment of upper housing 108 to lower housing 106 places insulating member 116 between upper housing 108 and lower housing 106.

By using conductive cup 110 and/or insulating member 116, activatable temperature indicator 102 can accurately control the temperature of lower indicator portion 112 and upper indicator portion 114. Conductive cup 110 increases heat conductivity between the container upon which indicator 102 is placed and lower indicator portion 112 which is positioned within conductive cup 110. Insulating member 116 insulates the center of upper housing 108, including upper indicator portion 114, from outside air. Thus, by using one or both of conductive cup 110 and insulating member 116, activatable temperature indicator 102 can more correctly identify when the container has reached the temperature which causes the material in lower temperature indicator 112 to reach its melting point. That is, conductive cup 110 passively directs heat flow and ensures that lower indicator portion 112 is as close to the temperature of the container as possible, and insulating member 116 forms a thermal barrier between the outside of activatable temperature indicator 102 and aperture 118, ensuring that the temperature of the surrounding environment has a minimal effect on activatable temperature indicator 102. As shown in FIG. 12, the bottom surface 135 of conductive cup 110 can protrude slightly from the bottom surface 120 of lower housing 106, ensuring that conductive cup 110 contacts and remains in contact with a container during use of activatable temperature indicator 102. The bottom surface 120 of lower housing 106 can also provide an air gap 117 around cupper cup 110 for additional insulation.

Like with activatable temperature indicator 2, activatable temperature indicator 102 is advantageous because attachment member 148 allows a person to activate activatable temperature indicator 102 without placing the person's fingers near upper indicator portion 114 and/or lower indicator portion 112. A person is able to keep their fingers away from the indicator portions because all the person must do is twist upper housing 108 and/or lower housing 106 with respect to each other to force upper indicator portion 114 and lower indicator portion 112 into contact.

Figure 20:
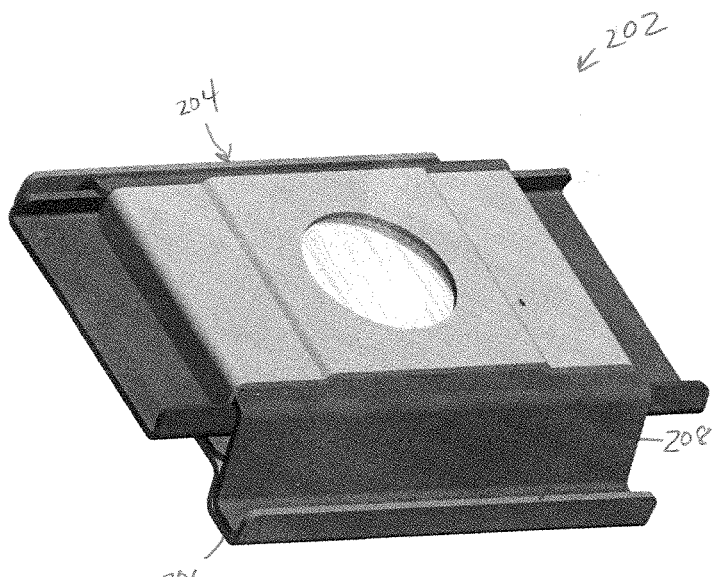
FIG. 20 depicts a top perspective view of another activatable temperature indicator, according to a third example embodiment of the present disclosure.
Figure 21:
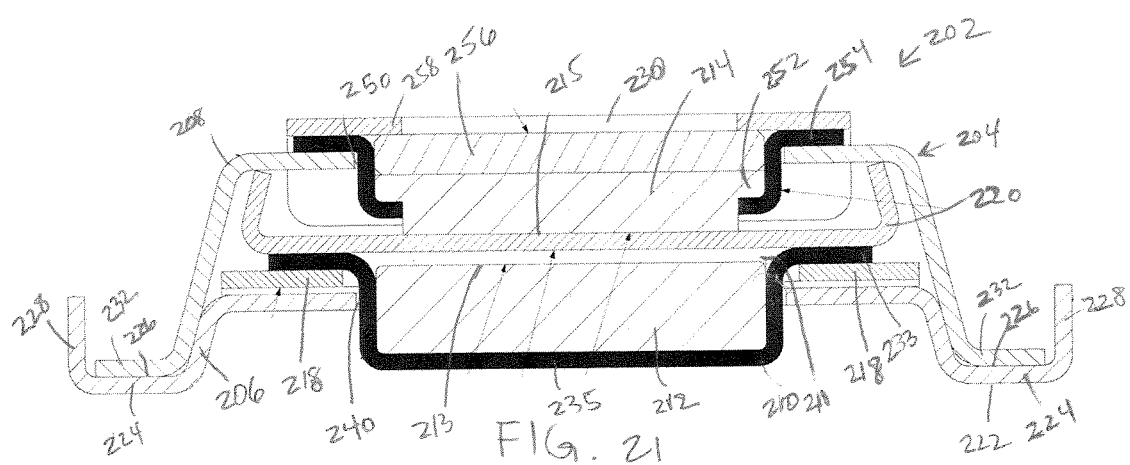
FIG. 21 depicts a cross-sectional view of the activatable temperature indicator of FIG. 20.
Figure 22:
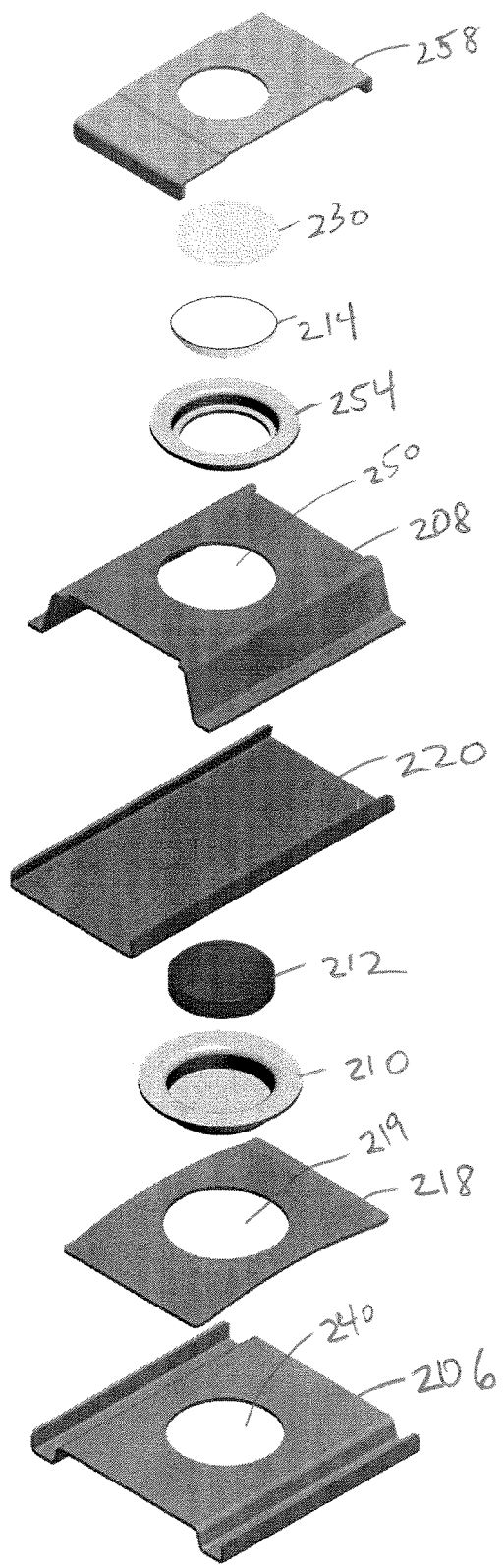
FIG. 22 depicts an exploded view of the activatable temperature indicator of FIG. 20.

FIGS. 20 to 22 show an alternative embodiment of an activatable temperature indicator 202 including a housing 204. In this embodiment, housing 204 includes a lower housing 206 and a upper housing 208, between which activatable temperature indicator 202 further includes a conductive cup 210, a lower indicator portion 212, an upper indicator portion 214, a biasing mechanism 218 and a separation member 220. In use, the bottom surface 222 of lower housing 206 is placed against and adheres to a container, for example, a vial or blood bag, and a person can view a change in the temperature of the container by viewing a change in color of upper indicator portion 214 through an aperture 230. Activatable temperature indicator 202 functions similarly to activatable temperature indicators 2, 102 and may include any of the features of activatable temperature indicators 2, 102. Activatable temperature indicators 2, 102 likewise may include any of the features of activatable temperature indicator 202.

In the embodiment shown, lower indicator portion 212 and upper indicator portion 214 are porous tablets, such as disks, including a foam plastic such as polyethylene. In an embodiment, lower indicator portion 212 has a height of about 0.065 inches and a diameter of about 0.29 inches, and upper indicator portion 214 has an upper height of 0.020 inches, an upper diameter of about 0.29 inches, and a lower height of about 0.025 inches and a lower diameter of about 0.25 inches. The upper height and upper diameter of upper indicator portion 214 correspond to the section that includes a step 252 that fits onto a ledge of holding cup 254, and the lower height and lower diameter of upper indicator portion 214 correspond to the section that comes into contact with lower indicator portion 212. Those of ordinary skill in the art will recognize that other shapes and materials can be used for lower indicator portion 212 and upper indicator portion 214.

Lower indicator portion 212 is filled with a material, such as a wax mixture, with a melting point. In an embodiment, the material is a wax mixture that includes an alkane wax and a liquid dye. When lower indicator portion 212 is held against upper indicator portion 214 and the material of lower indicator portion 212 reaches its melting point, the material migrates into upper indicator portion 214 and changes the color of upper indicator portion 214. A user viewing upper indicator portion 214 can therefore determine when lower indicator portion 212 has reached the melting point by viewing the change in color of upper indicator portion 214.

Lower housing 106 of activatable temperature indicator 202 can be made of stainless steel or any other suitable material. In an embodiment, stainless steel can be used to prevent evaporation of the material of lower indicator portion 212 and/or upper indicator portion 214. In the embodiment shown, lower housing 206 includes two flanges 224. The bottom surface 222 of flanges 224 can be placed against and adhere to a container, and top surface 226 of flanges 224 can receive corresponding flanges 232 of upper housing 208. When upper housing 208 is placed on top of lower housing 206, the outer edges 228 of flanges 224 of lower housing 206 can be folded over flanges 232 of upper housing 208 to secure upper housing 208 to lower housing 206. The attachment of upper housing 208 to lower housing 206 does not activate activatable temperature indicator 202 due to the presence of separation member 220 between lower indicator portion 212 and upper indicator portion 214. In an embodiment, lower housing 206 has a width of about 0.72 inches from the outer edges of flanges 224, a height of about 0.0725 inches, a length of about 0.750 inches, and a wall thickness of about 0.125 inches.

Lower housing 206 includes a central aperture 240 configured to receive conductive cup 210. In the embodiment shown, conductive cup 210 includes a lip 233 which rests on biasing mechanism 218 so that the base 235 of conductive cup 210 protrudes through aperture 219 of biasing mechanism 218 and aperture 240 of lower housing 206. Those of ordinary skill in the art will recognize other ways to position conductive cup 210 with respect to biasing mechanism 218 and lower housing 106.

Conductive cup 210 includes an indentation 211 for receiving and securing lower indicator portion 212. One purpose of conductive cup 210 is to provide increased heat conductivity within activatable temperature indicator 202. In the embodiment shown, conductive cup 210 is a copper cup. Copper is chosen because of its relatively high heat conductivity; it will be appreciated that other materials with good conductivity may be used in the alternative. In an embodiment, the outer diameter of lip 233 of conductive cup 210 is about 0.45 inches, the walls of conductive cup 210 are about 0.0125 inches thick, the diameter of indentation 211 is about 0.29 inches, and the depth of indentation 211 is about 0.075 inches.

In the embodiment shown, lip 233 of conductive cup 210 is placed on top of biasing mechanism 218 and the base 235 of copper cup 210 rests in an aperture 219 of biasing mechanism 218. Biasing mechanism 218 provides a biasing spring force to push conductive cup 210 and therefore lower indicator portion 212 into separation member 220 when separation member 220 is located between lower housing 206 and upper housing 208. Biasing member also provides a biasing spring force that pushes lower indicator portion 212, which is positioned within conductive cup 210, into contact with upper indicator portion 214 when separation member 220 has been removed from between lower indicator portion 212 and upper indicator portion 214. In an embodiment, biasing mechanism 218 can include one or more springs or spring strips. Those of ordinary skill in the art will recognize other configurations which allow biasing mechanism 218 to push lower indicator portion 212 into contact with upper indicator portion 214 when separation member 220 has been removed. In an alternative embodiment, conductive cup 210 can be removed and/or lower housing 206 and/or biasing mechanism 218 can be configured to directly hold onto lower indicator portion 212.

Upper housing 208 includes a central aperture 250 that is configured to receive upper indicator portion 214. Upper housing 208 of activatable temperature indicator 202 can be made of stainless steel or any other suitable material. In an embodiment, stainless steel can be used to prevent evaporation of the material of lower indicator portion 212 and/or upper indicator portion 214. In an embodiment, upper housing 208 has a width of about 0.705 inches from the outer edges of its flanges 232, a height of about 0.1655 inches, a length of about 0.750 inches, and a thickness of about 0.125 inches, and central aperture 250 is about 0.32 inches in diameter.

In the embodiment shown, upper indicator portion 214 includes a step 252 that fits onto a ledge of a holding cup 254 and that allows upper indicator portion 214 to protrude through holding cup 254 and contact lower indicator portion 212 when separation member 220 has been removed from between lower indicator portion 212 and upper indicator portion 214. A retainer 258, having an aperture or viewing port 230 in the center thereof, can be placed on top of upper indicator portion 214 to hold upper indicator portion 214 in place within holding cup 254. A viewing window 256 can also be placed on top of upper indicator portion 214 and/or between lower indicator portion 214 and disk retainer 258. In an embodiment, holding cup 254 has an outer diameter of about 0.41 inches and an inner diameter of about 0.29 inches, viewing window 256 has an outer diameter of about 0.29 inches and a thickness of about 0.30 inches, and retainer 258 has a width of about 0.710 inches, a length of about 0.42 inches, a thickness of about 0.125 inches, and an aperture that has a diameter of about 0.25 inches.

As set forth above, upper housing 208 can be attached to lower housing 206 without activating activatable temperature indicator 202 due to the presence of separation member 220. Activatable temperature indicator 202 is then activated by sliding separation member 220 in a direction parallel to a contact surface 213 of lower indicator portion 212 and/or a contact surface 215 of upper indicator portion 214 so that separation member 220 no longer lies between lower indicator portion 212 and upper indicator portion 214. Once separation member 220 has been slid to the side, biasing mechanism 218 forces conductive cup 210 and lower indicator portion 212 upward, which causes surface 213 of lower indicator portion 212 to contact surface 215 of upper indicator portion 214. In this way, biasing mechanism 218 acts as an activation mechanism to activate activatable temperature indicator 202 for use. Alternatively, biasing mechanism 218 can be positioned to bias another element of activatable temperature indicator 202, such as lower indicator portion 212 without conductive cup 210 and/or upper indicator portion 214. In an embodiment, biasing member 218 can be positioned to bias upper indicator portion 214 downward into lower indicator portion 212 when separation member 220 has been removed. Those of ordinary skill in the art will appreciate that biasing member 218 can be placed into different positions to achieve the same effect of activating activatable temperature indicators 2, 102 by biasing at least one of lower indicator portion 212 and upper indicator portion 214 against the other of lower indicator portion 212 and upper indicator portion 214.

Once separation member 220 has been removed, the biasing spring force provided by biasing mechanism 218 causes lower indicator portion 212 to remain in contact with upper indicator portion 214. Then, when the material of lower indicator portion 212 reaches a melting point, the material migrates into upper indicator portion 214 and changes the color of upper indicator portion 214. A user viewing upper indicator portion 214 can determine when the material of lower indicator portion 212 has reached the melting point by viewing the change in color of upper indicator portion 214 through viewing port 230, which can include a layer of glass or plastic to allow viewing of upper indicator portion from outside housing 4. Such a layer can be sufficiently transparent to allow color changes that meet color change standards to be readily observed.

In the embodiment shown, separation member 220 is a stainless steel U-shaped panel with a length of about 1 inch, a width of about 0.49 inches, and a height of about 0.063 inches. Those of ordinary skill in the art will recognize other suitable materials and dimensions to use for separation member 220. Those of ordinary skill in the art will also recognize other ways to place separation member 220 within activatable temperature indicator 202 to achieve the same effect of allowing lower indicator portion 212 to contact upper indicator portion 214 only when separation member 220 is removed.

In the embodiment show, biasing member 218 is a stainless steel spring strip. In an embodiment, biasing member 218 is about 0.75 inches long, about 0.52 inches wide, has an aperture 219 with a diameter of about 0.34 inches, and has a radius of curvature of about 0.130 inches so that biasing member 218 stands about 0.475 inches high when it is not exerting a biasing force. In an alternative embodiment, biasing member 218 can be one or more springs and/or spring strips. Those of ordinary skill in the art will recognize other configurations, materials and dimensions for biasing member 218.

Like with activatable temperature indicators 2, 102, copper cup 210 can be used to control the temperature of lower indicator portion 212 and upper indicator portion 214. Conductive cup 210 increases heat conductivity between the container upon which indicator 202 is placed and lower indicator portion 212 which is positioned within conductive cup 210. That is, conductive cup 210 passively directs heat flow and ensures that lower indicator portion 212 is as close to the temperature of the container as possible.

Activatable temperature indicator 202 can also include an insulating member, such as insulating member 16, to insulate the center of upper housing 208, upper indicator portion 214 and/or lower indicator portion 212 from outside air. In this way, activatable temperature indicator 202 can more correctly identify when the container has reached the temperature which causes the material in lower temperature indicator to reach its melting point. The insulating member can be used to form a thermal barrier from the outside of activatable temperature indicator 202, ensuring that the temperature of the surrounding environment has a minimal effect on activatable temperature indicator 202.

Figure 23:
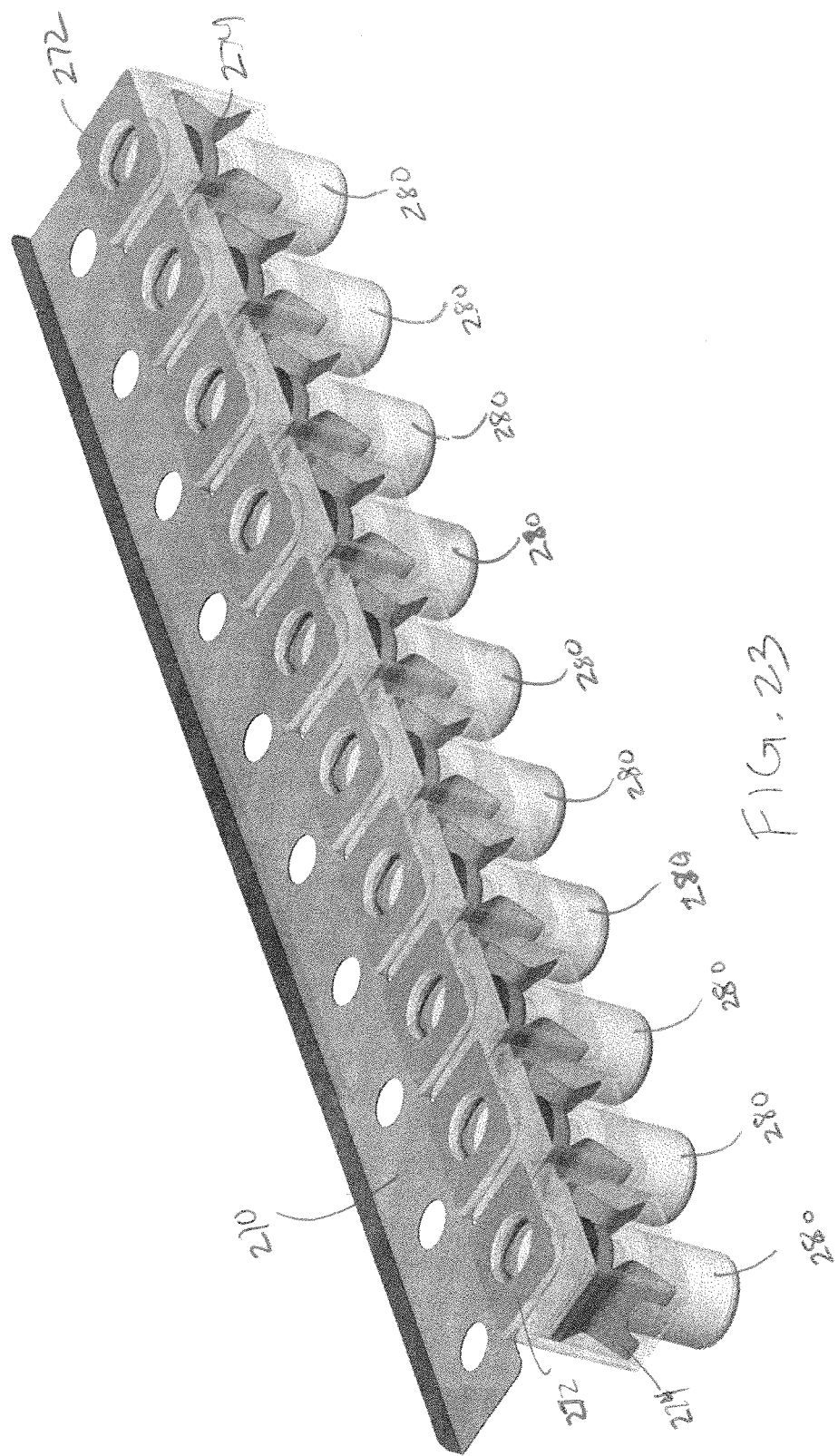
FIG. 23 depicts a rack that can be used in combination with the activatable temperature indicator of FIG. 20.

FIG. 23 depicts a rack 270 configured to hold a plurality of vials 280. As illustrated, the vials are mounted underneath a rectangular attachment member 272 including a clamp 274 for each vial 280. An activatable temperature indicator 202 can slide directly over each attachment member 272 to monitor each vial 280 located thereunder. In this way, each vial 280 can be monitored to determine when its contents reach the melting temperature of the material of each lower indicator portion 212. The specific rectangular shape of activatable temperature indicator 202 makes it easier to apply each activatable temperature indicator 202 to each attachment mechanism 272.

Like with activatable temperature indicators 2, 102, activatable temperature indicator 202 is advantageous because separation member 220 allows a person to activate activatable temperature indicator 202 without placing the person's fingers near upper indicator portion 214 and/or lower indicator portion 212. A person is able to keep their fingers away from the indicator portions because all the person must do is slide separation member 220 so that biasing mechanism 218 can force upper indicator portion 214 and lower indicator portion 212 into contact.

It should be understood that various changes and modifications to the presently preferred embodiments described herein will be apparent to those skilled in the art. Such changes and modifications can be made without departing from the spirit and scope of the present subject matter and without diminishing its intended advantages. It is therefore intended that such changes and modifications be covered by the appended claims.

We claim:

1. An activatable temperature indicator comprising:
a housing;
a conductive cup positioned in the housing;
a first indicator portion positioned within the conductive cup and held by the housing, the first indicator portion including a first material with a melting point;
a second indicator portion held by the housing, the second indicator portion including a second material configured to change color when combined with the first material of the first indicator portion when the first material reaches the melting point;
a separation member removeably positioned between the first indicator portion and the second indicator portion; and
a biasing mechanism configured to bias the first indicator portion and the second indicator portion into contact when the separation member is removed from between the first indicator portion and the second indicator portion.

2. The activatable temperature indicator of claim 1, wherein the biasing mechanism includes at least one spring or spring strip.

3. The activatable temperature indicator of claim 1, wherein the biasing mechanism biases one of the first indicator portion and the second indicator portion into contact with the other of the first indicator portion and the second indicator portion.

4. The activatable temperature indicator of claim 1, wherein at least one of the first indicator portion and the second indicator portion is a porous tablet.

5. The activatable temperature indicator of claim 1, wherein the first material includes a wax mixture.

6. The activatable temperature indicator of claim 1, which includes a viewing port that allows the second indicator portion to be viewed from outside of the housing.

7. The activatable temperature indicator of claim 1, wherein the biasing mechanism biases the first indicator portion and the second indicator portion into contact by biasing the conductive cup towards the second indicator portion.

8. The activatable temperature indicator of claim 1, wherein the housing includes stainless steel.

9. An activatable temperature indicator comprising:
a lower housing including a first material with a melting point;
an upper housing including a second material configured to change color when combined with the first material when the first material reaches the melting point; and
an attachment mechanism configured to attach the upper housing to the lower housing,
wherein attachment of the upper housing to the lower housing by the attachment mechanism places the first material in contact with the second material and holds the first material and the second material in contact when the first material reaches the melting point; and wherein the attachment mechanism includes at least two arms located on the lower housing, the at least two arms configured to fit into at least two apertures of the upper housing.

10. The activatable temperature indicator of claim 9, wherein the first material is positioned in a conductive cup held by the lower housing.

11. The activatable temperature indicator of claim 10, wherein the conductive cup includes copper.

12. The activatable temperature indicator of claim 9, wherein the upper housing includes an insulating member positioned around the second material.

13. The activatable temperature indicator of claim 9, wherein the lower housing includes a flange including a bottom surface configured to attach to a container.

14. The activatable temperature indicator of claim 9, wherein the attachment member attaches the upper housing to the lower housing when at least one of the upper housing and the lower housing is twisted with respect to the other of the upper housing and the lower housing.

15. An activatable temperature indicator comprising:
a housing including a bottom surface configured to attach to a container;
a conductive cup located proximate to the bottom surface of the housing;
a first indicator portion positioned within the conductive cup, the first indicator portion including a first material with a melting point;
a second indicator portion held by the housing, the second indicator portion including a second material configured to change color when combined with the first material of the first indicator portion when the first material reaches the melting point; and
an activation mechanism configured to bias the first indicator portion and the second indicator portion into contact before and after the first material reaches the melting point.

16. The activatable temperature indicator of claim 15, wherein the conductive cup includes copper.

17. The activatable temperature indicator of claim 15, which includes a separation member removeably positioned between the first indicator portion and the second indicator portion before the activation mechanism biases the first indicator portion and the second indicator portion into contact.

18. The activatable temperature indicator of claim 15, wherein the activation mechanism biases one of the first indicator portion and the second indicator portion into contact with the other of the first indicator portion and the second indicator portion.

19. The activatable temperature indicator of claim 15, wherein the activation mechanism includes at least one of: (i) an attachment mechanism; and (ii) a biasing mechanism.

20. The activatable temperature indicator of claim 19, wherein the housing includes an upper housing and a lower housing, and wherein the attachment mechanism biases the first indicator portion and the second indicator portion into contact when at least one of the upper housing and the lower housing is twisted with respect to the other of the upper housing and the lower housing.

21. An activatable temperature indicator comprising:
a lower housing;
a conductive cup held by the lower housing;
a first material with a melting point positioned within the conductive cup;

an upper housing including a second material configured to change color when combined with the first material when the first material reaches the melting point; and
an attachment mechanism configured to attach the upper housing to the lower housing;
wherein attachment of the upper housing to the lower housing by the attachment mechanism places the first material in contact with the second material and holds the first material and the second material in contact when the first material reaches the melting point.

* * * * *